Jan. 12, 1965   A. G. VANDERPOEL   3,165,099
ENGINE AFTERBURNER
Filed Dec. 10, 1962   2 Sheets-Sheet 1
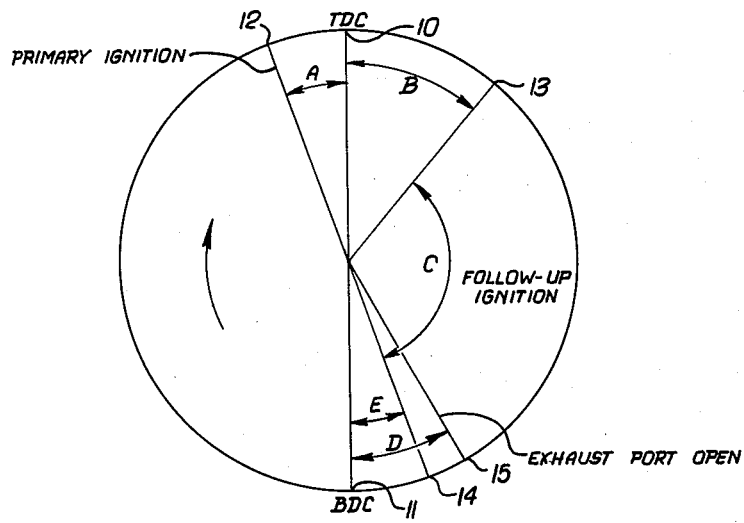
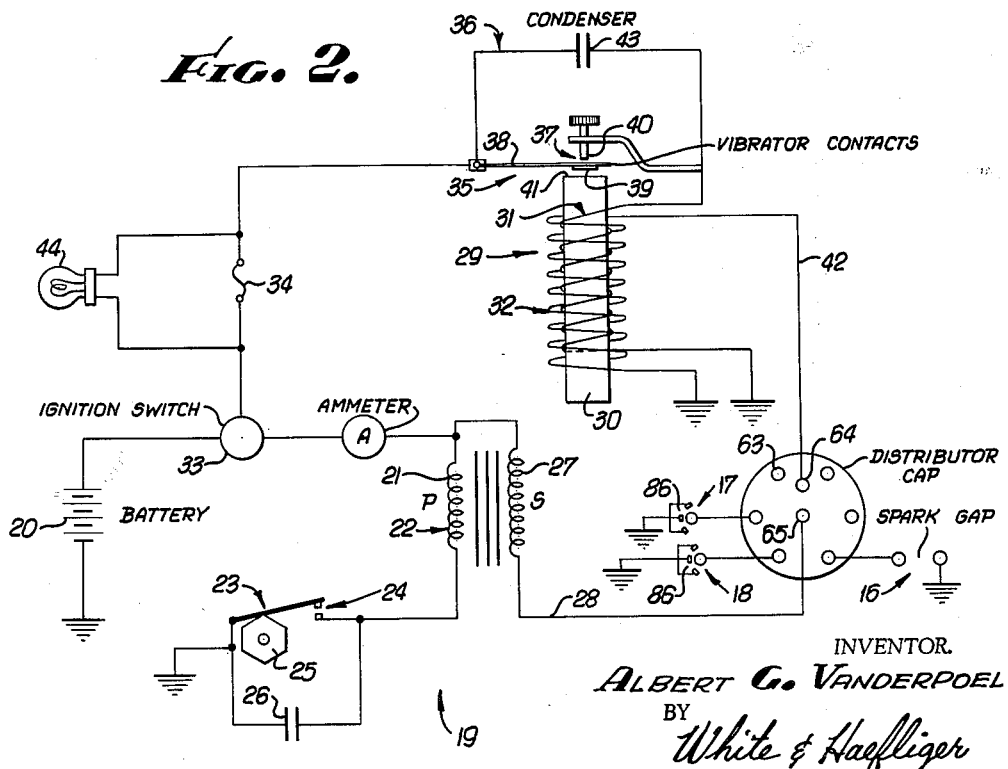
INVENTOR.
ALBERT G. VANDERPOEL
BY
White & Haefliger
ATTORNEYS.

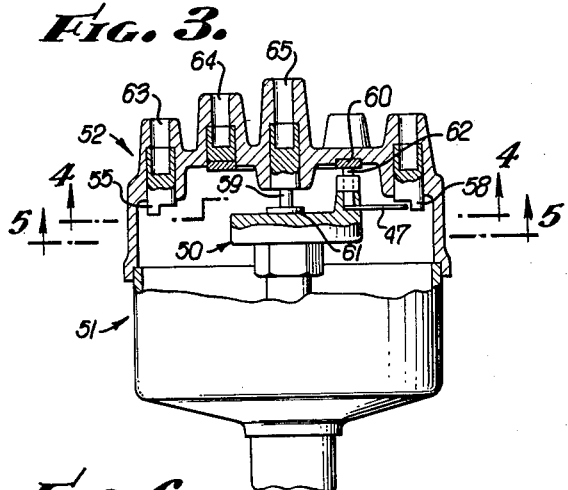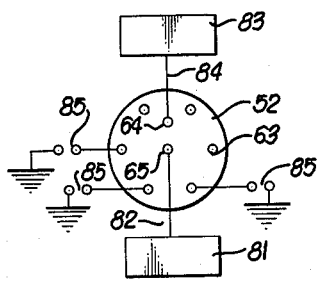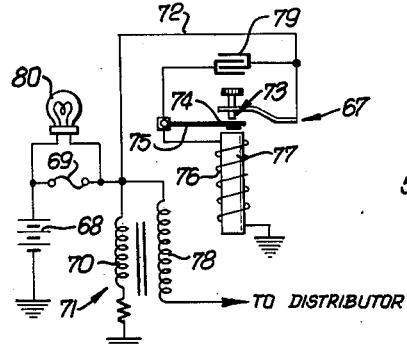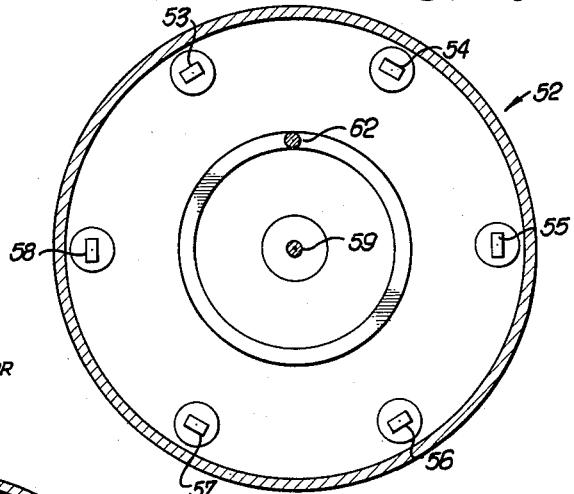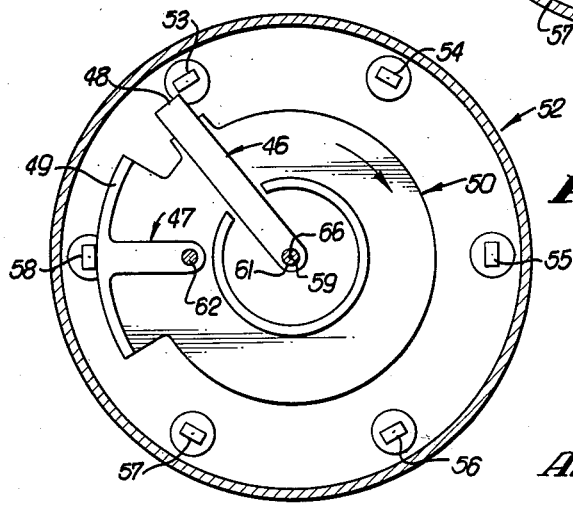
INVENTOR.
ALBERT G. VANDERPOEL
BY
White & Haefliger
ATTORNEYS.

United States Patent Office 3,165,099
Patented Jan. 12, 1965

3,165,099
ENGINE AFTERBURNER
Albert G. Vanderpoel, 14509 Van Ness Ave.,
Gardena, Calif.
Filed Dec. 10, 1962, Ser. No. 243,333
18 Claims. (Cl. 123—148)

This invention relates generally to internal combustion engine spark plug ignition systems, and more particularly concerns improvements in engine ignition resulting in better fuel combustion and reduction in objectionable exhaust emissions which create air pollution.

It has been found that relatively large gaps at spark plug electrodes increase the probability of regular firing of the combustible mixtures in the engine cylinders, especially at idling and part load conditions when so-called stratification by virtue of exhaust gas dilution is present. Thus, gaps as large as .060 inch will permit markedly improved fuel economy with more efficient combustion. However, because such gap widening requires higher voltages to jump the gaps, placing an additional load on the ignition coil as well as other component insulated parts particularly at open throttle conditions, the usual gap ranges from .025 to .040 for all around performance.

It has also been found that a single spark produced at the plug electrodes for each combustion cycle is less than desirably efficient to assure proper combustion at all engine speeds and various air-fuel mixtures, especially in multiple cylinder engines where mixtures vary due to poor manifold distribution. In this regard, consider that energy is added by the spark to a small volume of mixture proximate the plug electrodes, this increment being thereby raised to ignition temperature with consequent release of chemical energy. The small volumetric mixture tends to lose heat to the unburned gas at a very rapid rate because of the large temperature gradient, and continued ignition of the charge is lost when the rate of release of chemical energy by combustion is less than the rate of heat loss to the surrounding gas by conduction.

Evidence of inadequate combustion is found in the fact that sufficient remanent combustibles are present in the ordinary engine exhaust system to require exhaust afterburners or catalyst mufflers to control or eliminate such unburned gases. The problem in each of these types of devices is to burn up exhaust fumes which mainly constitute gasoline air mixtures which have been rejected by the engine. If temperature and pressure are not kept high enough in the exhaust purifier, the gasoline-air mixtures will not burn, and attempts to solve this problem have resulted in the equipping of exhaust afterburners with spark plugs operating to ignite the remanent combustibles and with catalysts which function to speed up oxiation, increasing the temperatures of the exhaust gases until they burst into flame. The unwanted exhaust emissions become more objectionable as the engine gradually loses performance due to wear and the usual lack of complete and continuing maintenance. In addition, crankcase gases are also absorbed into the combustion chamber, especially with closed crankcase ventilating systems, and these too must be treated in the exhaust afterburner.

It is a major object of the present invention to provide a simple solution to the above problems, and especially to substantially eliminate or greatly reduce undesirable exhaust emissions, through the provision of an afterburner operating to ignite any unburned gases present during the combustion expansion phase of the engine power cycle, i.e. during the power stroke, thereby taking advantage of high cylinder temperatures and giving additional boost to piston movement. To this end, the invention produces voltage pulses for creating primary and secondary sparking at the plug electrodes, and transmission of the pulses to the plug electrodes to initially ignite the combustible mixture in the engine cylinder as a result of primary sparking and thereafter to effect said secondary sparking at the electrodes during expansion of the initially ignited charge in the cylinder. The voltage pulses for producing secondary or follow-up sparking may typically be produced by a vibrator or pulse generator, which operates to deliver a continuous train of voltage pulses to the plug electrodes during a predetermined follow-up interval corresponding to a substantial portion of the expansion of the initially ignited charge in the cylinder.

Transmission of such voltage pulses to the electrodes may be accomplished by means including rotary leads having output contacts angularly offset in such leading and following traversing relation with respect to a fixed output contact connected to each plug that voltage transmitted through the contacts produces secondary sparking at plug electrodes after production of primary sparking is completed. To minimize spark plug gap growth from the eroding effect of the arc, spark plugs with multiple ground electrodes can be used, whereby the sparking will jump to ground electrode area or areas subject to lesser wear. Colder plugs can be used as fouling at lower speeds is eliminated.

These and other objects and advantages of the present invention, as well as the details of an illustrative embodiment will be more fully understood from the following detailed description of the drawings, in which:

FIG. 1 is a crank shaft diagram correlated to the ignition action;

FIG. 2 is a circuit diagram showing connections of the ignition components;

FIG. 3 is an elevation partly in section, showing the distributor construction;

FIG. 4 is an enlarged showing of the interior construction of the distributor, and taken on line 4—4 of FIG. 3;

FIG. 5 is a section taken on line 5—5 of FIG. 3;

FIG. 6 is a circuit diagram of a modified form of the invention; and

FIG. 7 is a diagram showing partly in blocked form the components of the ignition system.

Referring first to FIG 1 the principles of the invention may be explained as related to the crank shaft diagram wherein it will be understood that the power stroke of the piston is represented by clockwise travel from top dead center location 10 toward bottom dead center location 11.

Typically, primary ignition commences before the piston reaches top dead center as represented by the point 12 on the diagram which is at an angle A prior to the point 10, such an angle typically but not necessarily being around 20°. Follow-up or secondary ignition commences during the power stroke, as for example at the point 13 on the diagram at an angle B from the point 10, and typically this angle will be around 40°. Such follow-up ignition continues during the power stroke portion designated by the angle C between the point 13 and a point 14 on the diagram, this angle typically but not necessarily being around 120°. The exhaust port opens at point 15 on the diagram ahead of point 14, whereby follow-up ignition continues even after the exhaust port opens, such opening occurring at an angle D ahead of point 11, the angle typically being around 30°. Also, the follow-up ignition stops at an angle E ahead of point 11, this angle being typically around 20°. The angular dimensions recited are merely typical, and may be varied so long as the relationships between primary and secondary ignition to achieve the desired results of higher economy and more complete combustion are maintained.

Referring to FIG. 2, primary ignition will be understood as produced at the spark plug electrodes certain of which are shown at 16, 17 and 18 as a result of voltage pulses transmitted from the means generally shown at 19. It includes a battery 20 connected in series with the primary coil 21 of the transformer 22, and with the switch 23, the breaker points 24 of which are typically opened and closed in response to rotation of the engine driven cam 25. A condenser 26 is connected across the switch 23 to reduce arcing at the contacts or points 24.

The secondary 27 of the coil 22 is connected to what may be characterized as other means for transmitting the pulses to initially ignite the combustible mixture in the engine cylinder as a result of primary sparking. Such other means also functions to transmit pulses effecting secondary sparking at the electrodes during expansion of the initially ignited charge in the cylinder. For this purpose, means is provided for creating voltage pulses to produce such secondary sparking at the plug electrodes, one such means being generally indicated at 29 in the form of a vibrator. As illustrated, the vibrator includes an iron core 30 around which extend primary and secondary windings 31 and 32. The primary winding 31 is connected with the battery 20 through the ignition switch 33, a fuse 34, and a parallel circuit which includes branches 35 and 36. The branch 35 includes a switch 37 which is repeatedly opened and closed in response to vibrator action, and for this purpose the switch may include a spring arm 38 supporting contact 39 and biasing the contact into engagement with adjustable contact 40, whereby when the ignition switch is turned on, current surges through the branch 35 and through the primary winding 31 to energize magnetically the core 30. As a result, the arm 38 is drawn downwardly by attraction toward the pole 41 of the core 30, opening the switch contacts and breaking the circuit. Thereafter, the arm 38 biases the contact 39 back into engagement with contact 40 to reestablish current flow through the branch 35, these actions occurring at a high frequency and resulting in the induction and transmission of high voltage pulses from the secondary 32 through lead 42. The condenser 43 in the branch 36 serves to reduce arcing at the contacts 39 and 40.

A telltale light bulb is shown at 44 as connected across the fuse 34 in such relation that the bulb will not light during correct operation of the vibrator 29. If the latter malfunctions for any reason, as for example if the contacts 39 and 40 burn out or the coil 31 becomes defective, the fuse 34 will break, and the bulb 44 will light, warning the operator that the engine afterburner is not operating and needs attention.

The previously mentioned other means transmitting the pulses to initially ignite the charge as a result of primary sparking, and thereafter to effect secondary sparking, typically includes movable or rotary leads having output contacts angularly offset in such leading and following traversing relation with respect to a fixed output contact that voltage transmitted through these contacts produces secondary sparking at the plug electrodes after production of primary sparking is completed. Embodiments of such leads and contacts are shown in FIGS. 3 through 5, wherein rotary leads are shown at 46 and 47 having angularly offset output contacts 48 and 49, all mounted by a rotor 50 within a housing 51. The latter may be characterized as a distributor housing, the upper removable portion 52 of which carries the fixed output contacts 53 through 58 which are traversed by the rotary output contacts. In this connection, it will be understood that the fixed output contacts are electrically connected with appropriate spark plug electrodes, as previously mentioned.

Referring to FIG. 3, voltage pulses are transmitted to the rotary leads 46 and 47 through first and second fixed input contacts 59 and 60 respectively engaging rotary input contacts 61 and 62 on the rotary leads 46 and 47. In this regard, the fixed input contact 59 comprises a central post, whereas the fixed input contact 60 comprises an annulus carried by the head portion 52 of the housing. The latter also carries openings 63 for the terminals of the leads connecting the contacts 53 through 58 with the spark plugs, an opening 64 for the terminal of lead 42 connecting to the annular contact 60 and opening 65 for the terminal of lead 28 connecting to the fixed input contact 59. As pointed out previously, the output contact 49 extends over a sufficient angle or arc with respect to the rotor axis 66, as seen in FIG. 5, as to transmit voltage to a traversed fixed output contact during an interval corresponding to a substantial portion of the expansion of the initially ignited charge in the cylinder. Also, the rotary contact 48 is offset from the contact 49 to an extent such that primary sparking commences just prior to complete compression of the combustible mixture in the cylinder, and secondary sparking commences after partial expansion of the ignited charge in the cylinder.

Reference to FIG. 6 shows the first means to produce voltage pulses for creating secondary sparking at the plug electrodes to comprise the vibrator unit 67. Current flows from the battery 68 through a fuse 69 to parallel circuit branches, one of which comprises the primary coil 70 of the transformer 71. The other branch includes the lead 72, adjustable contact 73, vibrating contact 74 on arm 75, and the coil 76 around the vibrator core 77. Accordingly, the vibrator operates continuously to produce voltage pulses which are transmitted from the primary coil 70 to the secondary coil 78 and then to the FIG. 3 distributor contact 60, the operation of the distributor to transmit the pulses to the plug electrodes remaining the same as previously described. The spark coil for primary pulses is separate, and may be as shown in FIG. 2. The condenser 79 operates to reduce arcing at the contacts 73 and 74 across which the condenser is connected, and the telltale bulb 80 connected across fuse 69 indicates, when lighted, that the fuse has severed and the afterburner is not operating.

FIG. 7 shows the distributor cap 52 and block form sources of voltage pulses for creating primary and secondary sparking at the plug electrodes, the distributor functioning to transmit the pulses as previously described. Voltage pulse source 81 is connected to the center 65 and fixed contact 59 of the distributor as by means of lead 82, whereas the voltage pulse source 83 is connected through terminal 64 to the distributor fixed input contact 60 as by means of lead 84. Source 83 may for example comprise a transistor controlled unit such as an oscillator. The spark plug electrodes are generally indicated at 85.

Returning to FIG. 2 the spark plug electrodes 17 and 18 are each shown to have multiple ground electrodes 86, whereby the spark will jump to one ground electrode and when erosion thereof occurs the spark will jump to another ground electrode offering smaller electrical resistance. This feature minimizes spark plug gap growth from the effects of the arcing. Colder plugs can be used as fouling at lower speeds is eliminated.

I claim:

1. In an internal combustion engine spark plug ignition system wherein a spark plug has electrodes adapted for exposure to the interior of a cylinder containing a reciprocating piston repeatedly undergoing a power stroke, first means to produce voltage pulses for creating primary and secondary sparking at the plug electrodes, and other means for transmitting said pulses to initially ignite the combustible mixture in the engine cylinder as a result of said primary sparking and thereafter to effect said secondary sparking at said electrodes during expansion of the initially ignited charge in said cylinder and during exhausting of burned gases from the cylinder.

2. In an internal combustion engine spark plug ignition system wherein a spark plug has electrodes adapted for exposure to the interior of a cylinder containing a reciprocating piston repeatedly undergoing a power stroke, first means to produce voltage pulses for creating primary and secondary sparking at the plug electrodes, said first means including a vibrator, and other means for transmitting said pulses to initially ignite the combustible mixture in the engine cylinder as a result of said primary sparking and thereafter to effect said secondary sparking at said electrodes during expansion of the initially ignited charge in said cylinder and during exhausting of burned gases from the cylinder.

3. In an internal combustion engine spark plug ignition system wherein a spark plug has electrodes adapted for exposure to the interior of a cylinder containing a reciprocating piston repeatedly undergoing a power stroke, first means to produce voltage pulses for creating primary and secondary sparking at the plug electrodes, and other means for transmitting said pulses to initially ignite the combustible mixture in the engine cylinder as a result of said primary sparking and thereafter to effect said secondary sparking at said electrodes during expansion of the initially ignited charge in said cylinder and during exhausting of burned gases, said other means including a traverse contact in electrical communication with a plug electrode and movable leads having contacts offset in such leading and following relation with respect to the traverse contact that voltage pulses transmitted through said movable and traversed contacts produces secondary sparking at plug electrodes after production of said primary sparking at said electrodes, said other means including rotor structure to rotate said movable leads relative to said traverse contact.

4. In an internal combustion engine spark plug ignition system wherein a spark plug has electrodes adapted for exposure to the interior of a cylinder containing a reciprocating piston repeatedly undergoing a power stroke, first means to produce voltage pulses for creating primary and secondary sparking at the plug electrodes, said first means including a pulse generator operating to produce pulses creating said secondary sparking during a predetermined interval, and other means for transmitting said pulses to initially ignite the combustible mixture in the engine cylinder as a result of said primary sparking and thereafter to effect said secondary sparking at said electrodes continuously during said interval corresponding to a major portion of the expansion of the initially ignited charge in said cylinder, said interval ending only after commencement of exhausting of burned gases from the cylinder.

5. The invention as defined in claim 4 in which said other means includes a fixed output contact in electrical communication with a plug electrode and rotary leads having output contacts angularly offset in such leading and following traversing relation with respect to the fixed output contact that voltage pulses transmitted through said contacts produces secondary sparking at plug electrodes after production of said primary sparking at said electrodes is completed, said other means also including a rotor mounting said rotary leads.

6. The invention as defined in claim 5 in which said offsetting of said rotary output contacts is such that said primary sparking commences just prior to complete compression of the combustible mixture in said cylinder and said secondary sparking commences after partial expansion of the ignited charge.

7. The invention as defined in claim 5 in which said following output contact extends over a sufficient angle with respect to the rotor axis as to transmit voltage to said fixed output contact during said interval.

8. The invention as defined in claim 7 in which said other means includes first and second fixed input contacts, and first and second rotary input contacts respectively electrically connected with said first and second fixed input contacts, said rotary input contacts being electrically connected with said leading and following rotary output contacts through said rotary leads.

9. The invention as defined in claim 7 in which said pulse generator includes an electrical vibrator electrically connected with said following rotary output contact.

10. The invention as defined in claim 9 in which said first means includes an ignition voltage transformer secondary coil electrically connected with said leading rotary output contact.

11. The invention as defined in claim 10 in which said other means includes a series of fixed output contacts traversed by said rotary output contacts for transmitting said voltage pulses to a series of spark plug electrodes.

12. The invention as defined in claim 7 in which said pulse generator includes an electrical vibrator and said first means includes an ignition voltage transformer having a primary coil electrically connected with said vibrator and a secondary coil electrically connected with said leading and following rotary output contacts.

13. For combination in an internal combustion engine spark plug ignition system and wherein a spark plug has electrodes adapted for exposure to the interior of a cylinder containing a reciprocating piston repeatedly undergoing a power stroke including means to produce voltage pulses for creating primary sparking at the plug electrodes to initially ignite the combustible mixture in the engine cylinder, the improvement which comprises a pulse generator for producing pulses creating secondary sparking at the plug electrodes, and other means for transmitting said secondary sparking pulses to effect said secondary sparking during expansion of the initially ignited charge in said cylinder and during exhausting of burned gases from the cylinder.

14. For combination in an internal combustion engine spark plug ignition system and wherein a spark plug has electrodes adapted for exposure to the interior of a cylinder containing a reciprocating piston repeatedly undergoing a power stroke including means to produce voltage pulses for creating primary sparking at the plug electrodes, the improvement which comprises a pulse generator for producing pulses creating secondary ignition at the plug electrodes, and other means for transmitting said pulses to initially ignite the combustible mixture in the engine cylinder as a result of said primary sparking and thereafter to effect said secondary sparking at said electrodes during expansion of the initially ignited charge in said cylinder and during exhausting of burned gases from the cylinder.

15. The invention as defined in claim 14 in which said other means includes a fixed output contact in electrical communication with a plug electrode and rotary leads having output contacts angularly offset in such leading and following traversing relation with respect to the fixed output contact that voltage pulses transmitted through said contacts produces secondary sparking at plug electrodes after production of said primary sparking at said electrodes is completed, said other means also including a rotor mounting said rotary leads.

16. The invention as defined in claim 15 in which said offsetting of said rotary output contacts is such that said primary sparking commences just prior to complete compression of the combustible mixture in said cylinder and said secondary sparking commences after partial expansion of the ignited charge.

17. The invention as defined in claim 15 in which said following output contact extends over a sufficient angle with respect to the rotor axis as to transmit voltage to said fixed output contact during an interval corresponding to a substantial portion of the expansion of the initially ignited charge in said cylinder.

18. The invention as defined in claim 17 in which said pulse generator includes an electrical vibrator electrically connected with said following rotary output contact.

References Cited by the Examiner
UNITED STATES PATENTS

| | | | |
|---|---|---|---|
| 1,165,492 | 12/15 | Briggs | 123—148 |
| 1,466,719 | 9/23 | Howard | 123—148 |
| 1,507,307 | 9/24 | Chryst | 123—148 |
| 1,536,582 | 5/25 | Howard | 123—146.5 |
| 1,539,261 | 5/25 | Lindsay | 123—148 |
| 1,676,503 | 7/28 | Rippingille | 123—146.5 |

RICHARD B. WILKINSON, *Primary Examiner.*